(12) United States Patent
Malec et al.

(10) Patent No.: US 8,777,036 B2
(45) Date of Patent: Jul. 15, 2014

(54) RESERVOIR FOR A FUEL TANK

(75) Inventors: Radek Malec, Ceske Budejovice (CZ);
Vladimir Ptacek, Modrany (CZ);
Martin Ptacek, Ceske Budejovice (CZ);
Martin Sykora, Ceske Budejovice (CZ);
Josef Jarosik, Ceske Budejovice (CZ);
Miloslav Gabris, Ceske Budejovice (CZ)

(73) Assignee: Robert Bosch GmbH, Stuttgart (DE)

( * ) Notice: Subject to any disclaimer, the term of this patent is extended or adjusted under 35 U.S.C. 154(b) by 1068 days.

(21) Appl. No.: 12/447,081

(22) PCT Filed: Sep. 20, 2007

(86) PCT No.: PCT/EP2007/059937
§ 371 (c)(1),
(2), (4) Date: Jan. 20, 2011

(87) PCT Pub. No.: WO2008/049702
PCT Pub. Date: May 2, 2008

(65) Prior Publication Data
US 2011/0168723 A1    Jul. 14, 2011

(30) Foreign Application Priority Data
Oct. 25, 2006   (DE) .......................... 10 2006 050 161

(51) Int. Cl.
*B65D 6/00*        (2006.01)
*B60P 3/00*        (2006.01)

(52) U.S. Cl.
USPC ........................................ 220/4.12; 220/562

(58) Field of Classification Search
USPC ......... 220/562–565, 4.12; 137/859, 852, 843, 137/512.4
See application file for complete search history.

(56) References Cited

U.S. PATENT DOCUMENTS 3,085,591 A * 4/1963 Schneider ...................... 137/859
4,514,742 A * 4/1985 Suga et al. ...................... 347/85

(Continued)

FOREIGN PATENT DOCUMENTS

| DE | 19549192 A1 | 7/1997 |
| DE | 19752963 C1 | 4/1999 |
| EP | 1531257 A2 | 5/2005 |
| GB | 558201 A | 12/1943 |

*Primary Examiner* — Anthony Stashick
*Assistant Examiner* — Kaushikkumar Desai
(74) *Attorney, Agent, or Firm* — Michael Best & Friedrich LLP

(57) ABSTRACT

Reservoirs for fuel tanks, which can be filled via an opening that can be closed by a closing element, are already known. Such a closing element interacts with a sealing seat and is arranged on a bearing that is located in the region of the opening and is fixed to an edge area of the opening by at least two struts. In prior art, the opening, with the bearing and the struts, is often produced as a single-piece together with the reservoir and the base by injection molding. A disadvantage thereof is that the struts can undergo material shrinkage during production, which leads to a tension of the struts between the edge area of the opening and the bearing. This can lead to an irregular deformation and hence to an uneven sealing seat, so that the closing element does not seal in a tight manner and that the valve has a leak. in the reservoir according to the invention, the sealing of the opening is improved by at least one strut not having a rectilinear form, thus obtaining elastic expansion compensation.

18 Claims, 1 Drawing Sheet

(56) References Cited

U.S. PATENT DOCUMENTS

| | | | |
|---|---|---|---|
| 4,712,583 A * | 12/1987 | Pelmulder et al. | 137/852 |
| 4,986,310 A | 1/1991 | Bailey et al. | |
| 5,103,854 A * | 4/1992 | Bailey et al. | 137/102 |
| 5,680,847 A | 10/1997 | Begley et al. | |
| 6,152,114 A | 11/2000 | Kleppner | |
| 6,273,131 B1 * | 8/2001 | Kleppner | 137/565.22 |
| 7,090,341 B1 * | 8/2006 | Miyazawa | 347/85 |
| 7,665,833 B2 * | 2/2010 | Ishizawa et al. | 347/86 |
| 7,810,344 B2 * | 10/2010 | Yoon et al. | 62/338 |
| 2002/0180849 A1 * | 12/2002 | Sakai et al. | 347/86 |
| 2004/0051766 A1 * | 3/2004 | Miyazawa et al. | 347/86 |
| 2004/0056936 A1 * | 3/2004 | Usui et al. | 347/86 |
| 2005/0103805 A1 | 5/2005 | Briggs et al. | |
| 2005/0155583 A1 | 7/2005 | Mitsudou et al. | |

* cited by examiner

RESERVOIR FOR A FUEL TANK

CROSS-REFERENCE TO RELATED APPLICATION

This application is a 35 USC 371 application of PCT/EP 2007/059937 filed on Sep. 20, 2007.

BACKGROUND OF THE INVENTION

1. Field of the Invention

The invention is based on a reservoir for a fuel tank.

2. Description of the Prior Art

EP 0812387 A1 has already disclosed a device for supplying fuel, having a reservoir that can be filled via an opening that can be closed by means of a closing element. The closing element cooperates with a sealing seat and is situated on a support that is situated in the region of the opening and is fastened by means of at least two bridge pieces to an edge region of the opening.

In the prior art, the opening with the support and the bridge pieces is frequently manufactured together with the reservoir by means of injection molding and is integrally joined the reservoir bottom. During manufacture, the bridge pieces can experience a disadvantageous material shrinkage that causes a stressing of the bridge pieces between the edge region of the opening and the support. This can result in an irregular deformation and therefore an unevenness of the sealing seat so that the closing element does not close tightly, thus resulting in a leak in the valve.

ADVANTAGES AND SUMMARY OF THE INVENTION

The reservoir according to the invention has the advantage over the prior art that the tightness of the opening is improved in that the bridge pieces are embodied as deviating from a straight-line form so that an elastic longitudinal compensation is achieved. The longitudinal compensation decreases the stressing of the bridge pieces so that the sealing seat maintains its flatness. As a result, the bridge pieces no longer negatively affect the sealing action of the closing element.

According to an advantageous embodiment, the at least one bridge piece has a compensation region that has at least one U-shaped or V-shaped convexity or curvature.

It is particularly advantageous if the opening is provided in a bottom of the reservoir and the at least one bridge piece is embodied so that it protrudes out from the plane of the bottom. The protrusion from the plane achieves an expansion compensation that is favorable in terms of flow and that reduces the flow cross section of the opening only slightly.

According to an advantageous embodiment, the at least one bridge piece is embodied as arc-shaped, S-shaped, U-shaped, V-shaped, curved, or jagged.

It is very advantageous if the valve seat is embodied in the form of an annular shoulder since this makes the valve seat very dimensionally stable and less easily deformable, thus achieving a better-sealing valve.

It is also advantageous if the support is situated coaxially in the opening since this makes it possible to achieve the best sealing action.

It is also advantageous if the support is embodied as annular, with a hole in the middle since the closing element can thus be very simply supported in the hole.

It is also advantageous if the closing element is embodied as umbrella-shaped and elastically flexible since this achieves a very simple, reliable, and inexpensive valve function.

BRIEF DESCRIPTION OF THE DRAWINGS

An exemplary embodiment of the invention will be explained in greater detail in the subsequent description in conjunction with the drawings, in which.

DESCRIPTION OF THE PREFERRED EMBODIMENT

Figure 1:
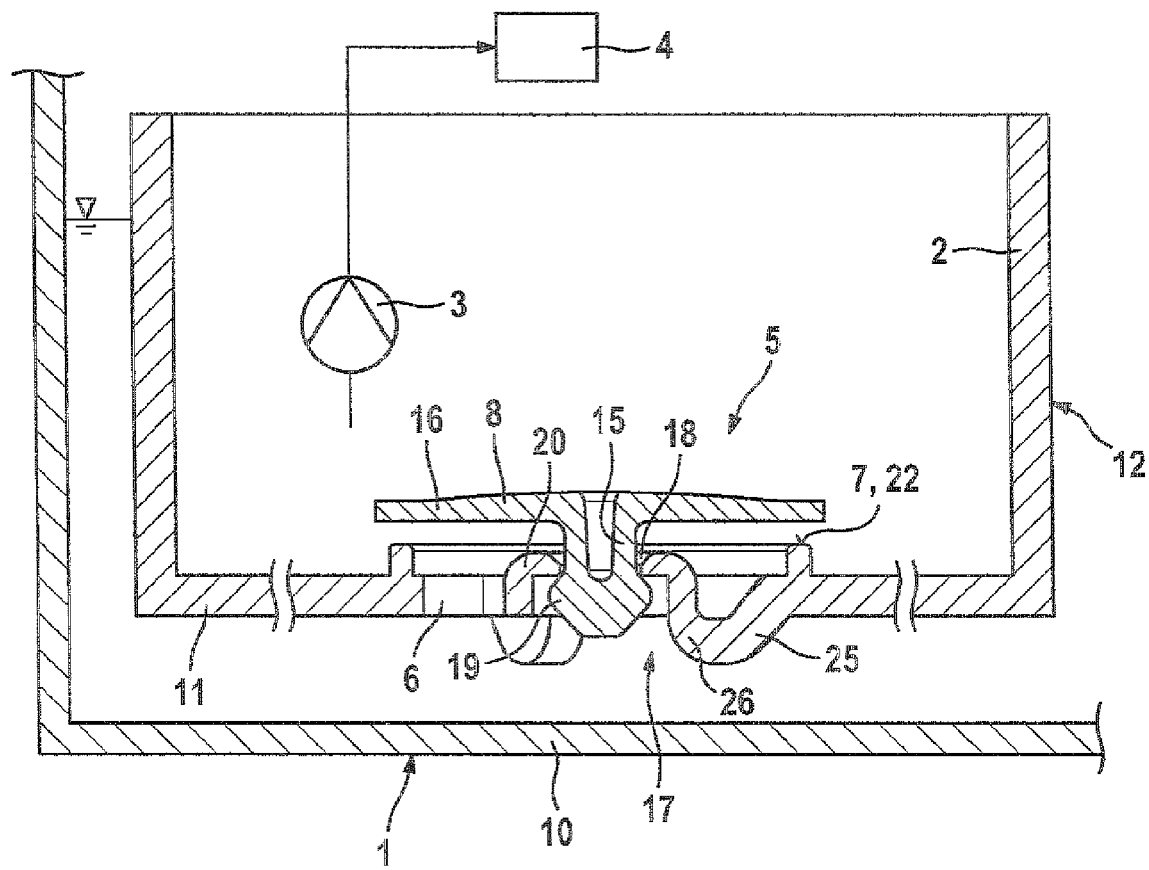
FIG. 1 shows a simplified cross section through a fuel-supplying device with the reservoir according to the invention and FIG. 2 is a three-dimensional view of part of the reservoir according to FIG. 1, with the opening of the reservoir according to the invention.

FIG. 1 shows a simplified cross section through a fuel-supplying device with the reservoir according to the invention.

The device has a reservoir 2 that is situated in a fuel tank 1 and in which a pumping unit 3 can be accommodated, which draws fuel from the reservoir 2 and supplies it to an internal combustion engine 4. It is also expressly possible, however, for the pumping unit 3 to be situated outside the reservoir 2 and the fuel tank 1, for example in an engine compartment of a vehicle.

When the fuel tank 1 is filled with fuel the first time, the fuel dispensed into the fuel tank 1 must flow automatically, i.e. without a supply mechanism such as a suction jet pump, into the cup-shaped reservoir 2 so that the vehicle can be started immediately. To this end, the reservoir 2 has an initial filling valve 5 that is formed by an opening 6 with a valve seat 7 and a closing element 8 that cooperates with the valve seat 7. The initial filling valve 5 only opens when the hydrostatic pressure in the fuel tank 1 is greater than in the reservoir 2. It functions as a check valve and permits fuel to flow only into the reservoir 2. The valve 5 stops the flow in the opposite direction out of the reservoir 2.

The opening 6 is provided in a lower region of the reservoir 2, close to a tank bottom 10 of the fuel tank 1, for example in a bottom 11 of the reservoir 2. It is also expressly possible for the opening 6 to be embodied in the lower region of a circumference wall 12 of the reservoir 2.

The initial filling valve 5 is embodied, for example, in the form of an umbrella valve, with an umbrella-shaped closing element 8. The closing element 8 has a pin-shaped or peg-shaped central section 15 and an arc-shaped or disk-shaped closing section 16 supported on the central section 15. According to this embodiment, the closing element 8 is elastically embodied and is manufactured out of an elastomer, for example rubber. The closing section 16 is therefore flexible and can bend back in the direction oriented away from the valve seat 7. The closing element 8, however, can also be made of a rigid plastic or metal.

The central section 15 and the closing section 16 of the closing element 8 are embodied of one piece, for example.

The central section 15 of the closing element 8 is secured in a support 17 that is situated coaxial to the opening 6, for example. The support 17 can be situated either in the opening 6 or on the outside in the region of the opening 6. The support 17 is embodied as annular, for example, with a hole in the middle, for example a through opening 18, through which the central section 15 of the closing element 8 protrudes. The closing element 8 is attached to the support in a form-locked fashion and/or in frictional, nonpositive fashion. For example, the closing element 8 is plugged into the support 17 and engages with it in detent fashion in that an undercut (not numbered) of the central section 15 engages behind a shoulder 20 embodied on the through opening 18. For example, the closing element 8 is supported in the support 17 in such a way that it is able to execute a predetermined axial opening stroke. The opening of the closing element 8 can take place through an axial stroke of the closing element 8 and/or through an elastic bending of the closing section 16.

The support 17 is secured in the region of the opening 6 by means of at least two, for example three bridge pieces 23. The bridge pieces 23 extend radially outward from the support 17 to the edge region of the opening 6 and are attached to it there, for example in an integrally joined fashion. The edge region of the opening 6 is, for example, part of the bottom 11 of the reservoir 2. It is also possible, however, for the initial filling valve 5 according to the invention to be embodied as a separate part that has an opening 6, a support 17, bridge pieces 23, and an edge region. Such a separate initial filling valve is then placed with its edge region in an opening of the reservoir 2.

The bridge pieces 23 are spaced apart from one another in the circumference direction and divide the opening 6 into several subsections.

When the bottom 11 of the reservoir 2, the opening 6, the bridge pieces 23, and the support 17 are injection-molded in one piece, material shrinkage can occur in the bridge pieces 23, exerting stresses on the bridge pieces 23 between the support 17 and the edge region of the opening 6. These stresses act on the valve seat 7 in the form of tensile forces oriented radially inward. When the stresses are of differing intensities, this results in an irregular deformation of the valve seat 7 so that its sealing seat 22, which is oriented toward the closing element 8 and cooperates with it, becomes uneven.

According to the invention, at least one bridge piece 23 is embodied as deviating from a straight-line form so that an elastic expansion compensation 24 is achieved. The expansion or longitudinal compensation 24 reduces or completely eliminates the stressing of the bridge pieces 23 due to material shrinkage so that the sealing seat 7 is either subjected to less powerful stresses or is not subjected to any at all.

According to one embodiment, the expansion compensation is achieved in that at least one bridge piece 23 is embodied so that part of it protrudes in an arbitrary fashion out from the plane of the bottom 11 or the opening 6.

For example, the expansion compensation 24 is achieved through an arc-shaped, S-shaped, U-shaped, V-shaped, curved, jagged, hook-shaped, or similar curve of the bridge pieces 23. For example, part of at least one bridge piece 23 has a U-shaped or V-shaped convexity or curvature.

According to one possible embodiment, at least one bridge piece 23 has a first leg 25 that extends to the edge region of the opening 6 and has a second leg 26 that extends to the support 17. The two legs 25, 26 enclose an acute angle and form a U-shaped or V-shaped convexity that bulges, for example, toward the tank bottom 10 of the fuel tank 1.

The valve seat 7 is formed by means of an annular shoulder 22 that is raised in relation to the bottom 11 of the reservoir and extends into the reservoir 2. The annular shoulder 22 lends the valve seat 7 an increased stability and makes it less easily deformable. This assures that the flatness of the valve seat 7 is maintained. The end surface of the shoulder 22 oriented away from the bottom 11 forms the sealing surface 22.

The reservoir 2 can be part of a fuel supply module that in addition to the pumping unit 3, also includes other components such as a coarse filter, a fine filter, a pressure regulator, and a suction jet pump.

Figure 2:
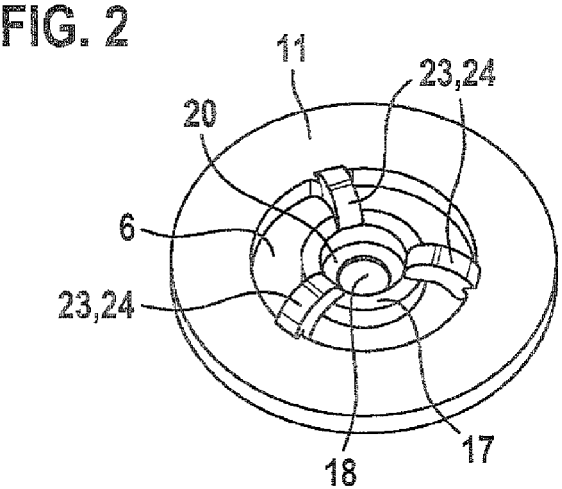

FIG. 2 is a three-dimensional view of part of the reservoir according to FIG. 1, with the opening of the reservoir according to the invention. The drawing shows a part of the reservoir from underneath.

In the view according to FIG. 2, parts that remain the same or that function in the same manner as those in the device according to FIG. 1 have been labeled with the same reference numerals.

The foregoing relates to the preferred exemplary embodiments of the invention, it being understood that other variants and embodiments thereof are possible within the spirit and scope of the invention, the latter being defined by the appended claims.

The invention claimed is:

1. A fuel tank reservoir, comprising:
   an opening via which the reservoir is fillable, the opening being closable by a closing element,
   wherein the closing element cooperates with a sealing seat in a closed position and moves from an open position to the closed position axially within a support that is fastened by a plurality of radially spaced bridge pieces to an edge region of the opening,
   wherein at least one of the bridge pieces deviates from a straight-line form so that an elastic expansion compensation is achieved,
   wherein at least one of the bridge pieces has a first leg that extends to the edge region of the opening and has a second leg that extends to the support,
   wherein the first leg and the second leg form a U-shaped or V-shaped indentation having an acute angle, and
   wherein the U-shaped or V-shaped indentation projects out of the plane of the opening towards an outside of the reservoir.

2. The reservoir as recited in claim 1, wherein at least one of the bridge pieces has a compensation region that has the at least one U-shaped or V-shaped convexity or curvature.

3. The reservoir as recited in claim 1, wherein the opening is provided in a bottom of the reservoir and at least one of the bridge pieces protrudes out from a plane of the bottom of the reservoir.

4. The reservoir as recited in claim 1, wherein at least one of the bridge pieces is arc-shaped, S-shaped, U-shaped, V-shaped, curved, or jagged.

5. The reservoir as recited in claim 1, wherein the opening is provided in a bottom of the reservoir.

6. The reservoir as recited in claim 1, wherein the sealing seat is an annular shoulder.

7. The reservoir as recited in claim 1, wherein the support is coaxial to the opening.

8. The reservoir as recited in claim 1, wherein the support is annular, with a hole in the middle of the support.

9. The reservoir as recited in claim 1, wherein the closing element is umbrella-shaped, with a pin-shaped central section and a disk-shaped closing section.

10. The reservoir as recited in claim 1, wherein the bridge pieces are spaced around a circumference of the support.

11. A fuel tank reservoir Tillable via an opening that is closable by a closing element,
   wherein the closing element cooperates with a sealing seat and moves axially onto a support that is fastened by a plurality of radially spaced bridge pieces to an edge region of the opening,
   wherein at least one of the bridge pieces deviates from a straight-line form so that an elastic expansion compensation is achieved, and
   wherein the bridge pieces are spaced around a circumference of the support.

12. The reservoir as recited in claim 11, wherein at least one of the bridge pieces has a first leg that extends to the edge region of the opening and has a second leg that extends to the support,
   wherein the first leg and the second leg form a U-shaped or V-shaped indentation having an acute angle, and
   wherein the U-shaped or V-shaped indentation projects out of the plane of the opening towards an outside of the reservoir.

13. The reservoir as recited in claim 1, wherein the bridge pieces are formed in one piece.

14. The reservoir as recited in claim 1, wherein the bridge pieces and the support are formed in one piece.

15. The reservoir as recited in claim 3, wherein the bridge pieces, the support, and the bottom of the reservoir are formed in one piece.

16. A fuel tank reservoir, comprising:
- an opening via which the reservoir is Tillable when a closing element is in an open position;
- the closing element that closes the opening in a closed position;
- a valve seat that cooperates with the closing element to close the opening, the opening being surrounded by the valve seat;
- a support being surrounded by the opening and supporting the closing element, the opening being disposed radially around the support, the closing element moving axially within the support between the open and closed positions; and
- a plurality of bridge pieces that fasten the support to an edge of the opening, the bridge pieces being radially spaced around the support, wherein
- at least one of the bridge pieces of the support deviates from a straight-line form whereby
- the at least one of the bridge pieces has a first leg that extends to the edge of the opening and has a second leg that extends to the support, and the first leg and the second leg form a U-shaped or V-shaped indentation having an acute angle, and
- the U-shaped or V-shaped indentation projects out of the plane of the opening towards an outside of the reservoir.

17. The reservoir as recited in claim 16, wherein the bridge pieces are equally spaced around the support.

18. The reservoir as recited in claim 1, wherein the pin-shaped central section fits within the support to close the opening.

* * * * *